United States Patent [19]

Balint et al.

[11] 4,233,279
[45] Nov. 11, 1980

[54] PROCESS FOR THE SYNTHESIS OF AMMONIUM NITRITE

[75] Inventors: Laszlo J. Balint; Lamberto Crescentini; William B. Fisher, all of Chester; Muhammad S. Sahli, Richmond, all of Va.

[73] Assignee: Allied Chemical Corporation, Morris Township, Morris County, N.J.

[21] Appl. No.: 44,878

[22] Filed: Jun. 4, 1979

Related U.S. Application Data

[63] Continuation-in-part of Ser. No. 881,453, Feb. 27, 1978, abandoned, which is a continuation-in-part of Ser. No. 790,526, Apr. 25, 1977, abandoned.

[51] Int. Cl.³ .......................................... C01B 21/50
[52] U.S. Cl. .................................... 423/385; 423/235; 423/396
[58] Field of Search ................ 423/385, 235, 387, 396

[56] References Cited

U.S. PATENT DOCUMENTS

| | | | |
|---|---|---|---|
| 3,835,622 | 9/1974 | Henderson | 423/393 |
| 3,928,543 | 12/1975 | Gregory et al. | 423/385 |
| 4,009,246 | 2/1977 | Wendel | 423/385 |
| 4,045,540 | 8/1977 | Hertzog | 423/385 |

FOREIGN PATENT DOCUMENTS 1042176 9/1966 United Kingdom ...................... 423/385

OTHER PUBLICATIONS

Sienko et al., "Chemistry," McGraw Hill Book Co., 2nd Ed., 1961, pp. 262-269.

Primary Examiner—Earl C. Thomas
Attorney, Agent, or Firm—Richard A. Anderson

[57] ABSTRACT

Ammonium nitrite is commercially produced by contacting a gaseous stream containing nitric oxide, nitrogen dioxide, nitrogen and oxygen with an aqueous solution containing a basically reacting ammonium compound in an absorption system. However, at normal production rates, serious problems have been encountered because of relatively low yield of ammonium nitrite and the emission of unreacted nitric oxide which causes pollution of the atmosphere. It has now been found that in situ generation of nitrogen dioxide in the absorption system by operating the absorption system under slight pressure greatly improves ammonium nitrite yield, reduces nitrogen oxide emission, reduces loss of ammonia as nitrogen and minimizes mist formation in the vent gas. Moreover, with respect to environmental pollution, we have discovered that a synergistic improvement results from an interaction effect involving use of said sight pressure in combination with late addition of controlled supplemental quantities of nitrogen dioxide to the nitrogen oxide gas while said gas is being absorbed in the absorption system.

7 Claims, 1 Drawing Figure

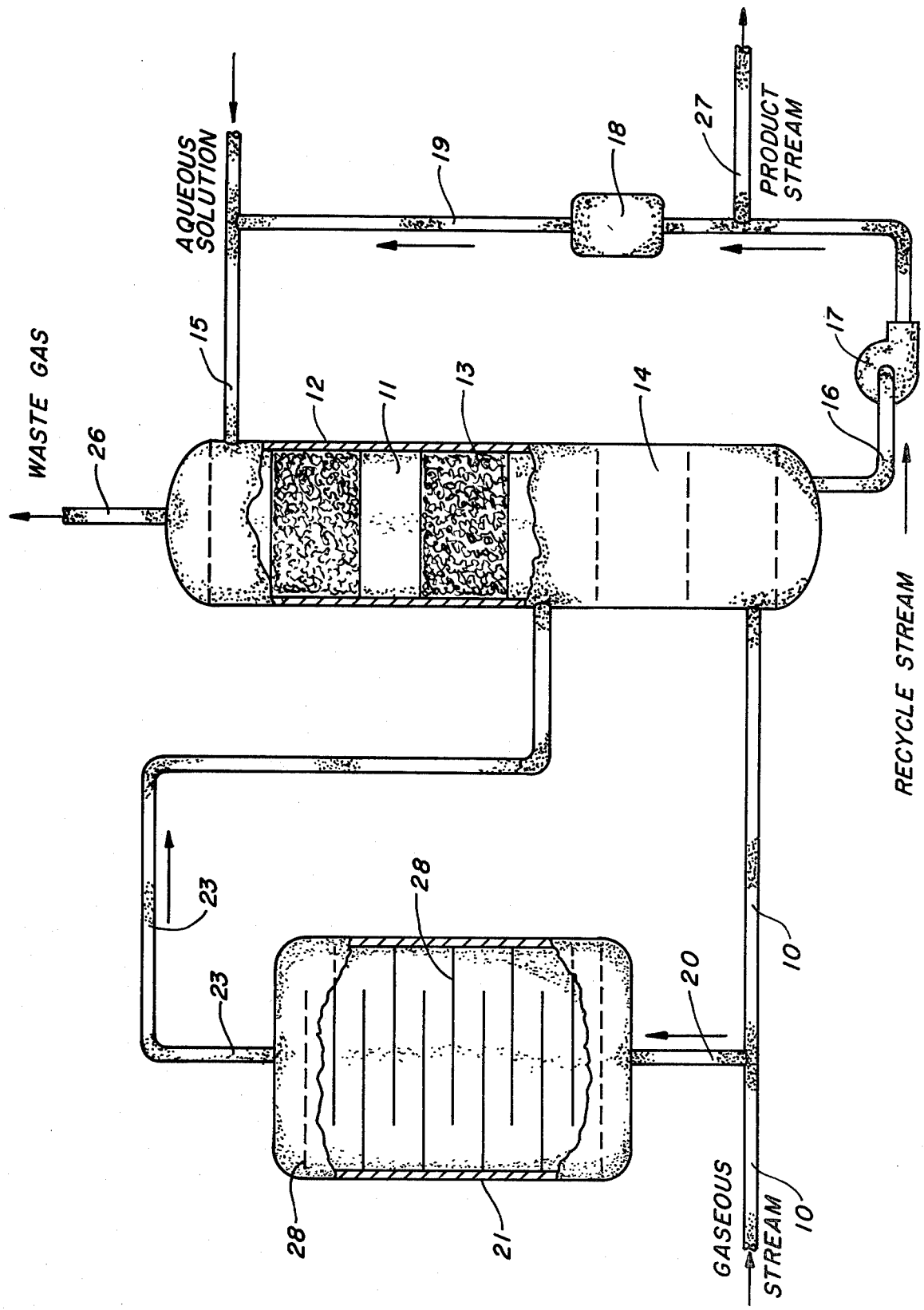

PROCESS FOR THE SYNTHESIS OF AMMONIUM NITRITE

CROSS REFERENCES TO RELATED APPLICATIONS

This application is a continuation-in-part of application Ser. No. 881,453, filed Feb. 27, 1978, now abandoned, which is a continuation-in-part of application Ser. No. 790,526, filed Apr. 25, 1977, now abandoned.

BACKGROUND OF THE INVENTION

This invention relates to a process for producing ammonium nitrite. More particularly, it relates to an improved process for producing ammonium nitrite by contacting in an absorption system a gaseous stream containing nitric oxide, nitrogen dioxide and oxygen with an aqueous solution containing a basically reacting ammonium compound, said process characterized by improved yield and reduced nitrogen oxide emission accomplished by controlling the pressure, and preferably adding controlled supplemental quantities of nitrogen dioxide to the absorption system.

One of the principal uses of ammonium nitrite is for the production of hydroxylamine compounds. For such work, an aqueous solution of ammonium nitrite can be used.

The nitrite-producing reaction dealt with herein can be considered as a type of gas absorption, including physical absorption of gaseous components by the basic ammonium compound solution and stripping of volatile components from this solution, together with a multiplicity of liquid phase and gas phase reactions and side reactions. While the complexity and rapidity of what occurs during absorption may preclude exact knowledge of the chemical and physical mechanisms for the process, the following equations will serve as a guide for understanding the reaction using, for example, ammonium bicarbonate as the basic ammonium compound added to the absorbing solution.

PRINCIPAL REACTIONS $$2NO + O_2 \rightleftharpoons 2NO_2 \rightleftharpoons N_2O_4$$

$$NO + NO_2 \rightleftharpoons N_2O_3$$

$$N_2O_3 + H_2O \rightarrow 2HNO_2$$

$$HNO_2 + NH_4HCO_3 \rightarrow NH_4NO_2 + CO_2 + H_2O$$

UNDESIRABLE SIDE REACTIONS $$5NO_2 + 4NH_4HCO_3 \rightarrow 3NH_4NO_3 + NH_4NO_2 + 2H_2O + NO + 4CO_2$$

$$8NH_3 + 6NO_2 \rightarrow 7N_2 + 12H_2O$$

$$NH_4NO_2 \rightarrow N_2 + 2H_2O$$

Pertinent patents in this field include U.S. Pat. No. 1,061,630 to Pauling; No. 1,070,070 to Rothe; No. 1,978,431 to Kirst et al.; No. 2,752,224 to Joris; No. 2,797,144 to Joris; No. 2,805,122 to Bostian; No. 2,805,123 to Bostian; No. 3,835,622 to Henderson; No. 3,932,593 to Bonfield; and No. 4,009,246 to Wendel. The most pertinent prior art is believed to be U.S. Pat. No. 4,045,540 to Hertzog, which is directed to a process for the synthesis of ammonium nitrite whereby ammonium nitrite yield is improved and emission of nitrogen oxides in the stack gas is reduced to about 8,700 ppm. However, release of this amount of nitrogen oxides into the atmosphere is still excessive and does not meet present environmental standards.

Although each of these patents represents an important contribution to this art, none teaches a process that overcomes the basic problem of increasing ammonium nitrite yield while avoiding environmental pollution by nitrogen oxide emission. Accordingly, research has continued to develop an improved process for production of ammonium nitrite wherein yield is improved and nitrogen oxide emission is substantially reduced.

SUMMARY OF THE INVENTION

The process of the present invention may be summarized as follows. In a process for producing ammonium nitrite by the absorption of a gas containing nitric oxide, nitrogen dioxide, oxygen, and at least 65 percent by volume of inert gas in an absorption system with an aqueous absorbing solution containing a basically reacting ammonium compound, employing entering gas with at least 2.0 mol ratio of nitric oxide:nitrogen dioxide and employing absorbing solution having normality of at least 0.1 with respect to the basic ammonium reactants, the improvement which comprises maintaining the absorption system at a pressure of 2 to 25 psig. We prefer to add supplemental nitrogen dioxide to said gas being absorbed in the absorption system, said supplemental nitrogen dioxide being added to said gas when the absorption of nitrogen oxides is 50 to 99 percent complete based on the nitrogen oxides in the entering gas.

The use of slight superatmospheric pressure in the absorption system in accordance with the present invention provides controlled in situ generation of nitrogen dioxide. Surprisingly, said in situ generation of nitrogen dioxide within the system greatly improves ammonium nitrite yield, reduces emission of nitrogen oxides, reduces loss of ammonia as nitrogen, and minimizes formation of ammonium nitrate-ammonium nitrite containing mist in the vent gas.

DESCRIPTION OF THE DRAWING

The accompanying drawing is a diagrammatic flow sheet illustrating the preferred embodiment of the present invention.

DESCRIPTION OF THE PREFERRED EMBODIMENT

The preferred embodiment of this invention may be briefly stated as follows. In a process for producing ammonium nitrite by the absorption of a gas containing nitric oxide, nitrogen dioxide, oxygen, and at least 65 percent by volume of inert gas in an absorption system with an aqueous absorbing solution containing a basically reacting ammonium compound, employing entering gas with at least 2.0 mol ratio of nitric oxide:nitrogen dioxide and employing absorbing solution having normality of at least 0.6 with respect to the basic ammonium reactants, the improvement which comprises:

(a) maintaining the absorption system at a pressure of 5 to 20 psig;

(b) adding supplemental nitrogen dioxide to said gas being absorbed in the absorption system, said supplemental nitrogen dioxide being added to said gas when the absorption of nitrogen oxides is 50 to 99 percent complete based on the nitrogen oxides in the entering gas, said supplemental nitrogen dioxide being added to said gas in amount sufficient to provide a nitrogen dioxide:nitric oxide mol ratio between 1 and 4 in the resulting mixture.

When, in accordance with the process of the present invention, a gaseous stream containing nitric oxide, nitrogen dioxide, and oxygen is contacted with an aqueous solution containing a basically reacting ammonium compound, the reaction to form ammonium nitrite is believed to occur by a series of stepwise reactions as described hereinabove. The use of controlled superatmospheric pressure in the instant absorption system, combined with late introduction of supplemental nitrogen dioxide into the absorption system in accordance with the preferred process of this invention, reduces atmospheric pollution and vent losses of nitrogen oxides up to 20 fold or more as compared with conventional methods. Moreover, said late addition of nitrogen dioxide to the system also improves absorption efficiency because the optimum nitrogen dioxide:nitric oxide mol ratio for maximum absorption increases with decreasing concentration of nitrogen oxides. Such improvement reflects a significant cost advantage due to the large tonnages of ammonium nitrite which are used annually by industry, for example, in the production of hydroxylamine compounds. Hydroxylamine compounds are used in large quantities for the manufacture of caprolactam via an intermediate, cyclohexanone oxime.

Gaseous streams which may be used for the practice of this invention can be obtained by catalytic combustion of ammonia-air mixtures, by electric arc combustion of air, by thermal fixation of the nitrogen in the air, or as by-product gas from other chemical processes. Gaseous streams containing nitric oxide produced by catalytic combustion of ammonia-air mixtures are preferred because they are ordinarily the most economical for the most efficient practice of this invention. In particular, gaseous streams derived from combustion of ammonia-air mixtures having from about 6 to 10 volume percent ammonia are especially preferred for their economy and efficiency in the process of the present invention. Such gases contain at the oxidizer exit approximately 6 to 10 volume percent nitric oxide on an anhydrous and ammonia-free basis, together with approximately 8 to 12 volume percent oxygen and 65 to 80 volume percent nitrogen.

When a gaseous stream containing nitric oxide is employed which does not also contain oxygen, oxygen from an oxygen-containing gas, conveniently air, may be introduced into the gaseous stream.

It has been found that higher yields of ammonium nitrite and significant reduction in vent losses of nitrogen oxides are obtained by operating the absorption system at a pressure of 5 to 20 psig and by introducing controlled supplemental quantities of nitrogen dioxide into the absorption system. While various means may be used to introduce nitrogen dioxide into the absorption system, the process in its preferred form involves continuously injecting the nitrogen dioxide directly into the absorption system. The nitrogen dioxide is generally introduced into the absorption system in an amount corresponding to a concentration of at least 1.0 volume percent of the gaseous stream in the absorption system. Preferably, sufficient nitrogen dioxide is added to maintain a nitrogen dioxide:nitric oxide mol ratio between 1 and 4 in the resulting gas mixture. Preferably, the nitrogen dioxide is added when the absorption of nitrogen oxides is 50 to 99 percent complete.

The term "basically reacting ammonium compound" as used herein is intended to include one or more members of the group consisting of ammonium carbonate, ammonium bicarbonate and ammonium hydroxide. The basically reacting ammonium compound employed in the process of the present invention may be conveniently incorporated in the aqueous solution prior to the introduction of this solution into the absorption system for ammonium nitrite production. Preferably, the absorbing solution should always have a normality of at least 0.6 with respect to the basic ammonium reactants.

While the selected basically reacting ammonium compound may be employed in the aqueous solution in various concentrations, when ammonium bicarbonate is used as the basically reacting ammonium compound, the concentration of the compound in the aqueous solution is generally from about 1 to 21 weight percent, and is preferably from about 4 to 20 weight percent. When ammonium carbonate is employed as the basically reacting ammonium compound, the concentration of the compound in the aqueous solution is generally from about 1 to 30 weight percent, and preferably from about 4 to 20 weight percent. More than about 21 weight percent ammonium bicarbonate or more than about 30 weight percent ammonium carbonate is not possible under normal operating conditions due to the limit of solubility of these compounds in water. Highest yields of ammonium nitrite are obtained when the aqueous solution, which contains the basically reacting ammonium compound, is maintained at a temperature between about $-5°$ C. and $35°$ C.

The aqueous absorption solution fed into the absorption system in the present invention should be maintained at a pH of at least about 7.5, preferably 8.0 to 9.0, thereby avoiding significant decomposition of the ammonium nitrite product which occurs under acidic conditions.

The supplemental nitrogen dioxide for addition to the absorption system, in accordance with the present invention, may be prepared by any suitable method known to this art. For example, it is conveniently prepared by the well known ammonia oxidation-nitric oxide oxidation method. Ammonia is catalytically oxidized to form nitric oxide and water. Under conditions normally used, about 94–96 percent of the ammonia is converted to nitric oxide as the reaction proceeds at a very rapid rate. Nitrogen dioxide is then formed from the oxidation of nitric oxide. The oxidation proceeds spontaneously at atmospheric temperatures but, contrary to the general rule in such cases, at a relatively slow rate. The reaction also differs from general rules in that it proceeds more rapidly with lowered temperatures whereas most reaction rates increase as the temperature is increased. For these reasons, the oxidation of nitric oxide is usually carried out at as low a temperature as economically practical and a relatively long retention time is provided. The reaction is exothermic and, therefore, cooling must be provided to remove the heat of reaction as well as to cool the gas to the temperature desired for the nitric oxide oxidation. Normally, the temperature for final reaction is about $15°–75°$ C., with reaction times up to 5 minutes or longer.

The preferred process of this invention may be illustrated by reference to the accompanying drawing wherein the process is carried out in a continuous manner.

A major portion of a gaseous stream such as produced by ammonia oxidation containing nitric oxide, nitrogen dioxide, and oxygen, and having at least 2.0 mol ratio of nitric oxide:nitrogen dioxide is passed via line 10 into the lower portion of absorption chamber 11, having one or more packed sections, e.g., three packed sections 12, 13, and 14, and maintained at a pressure of 5 to 20 psig. Chamber 11 is the packed absorption column shown in which the gas phase is continuous. That is, there is no flooding of the column or packing, no continuous liquid phase, and only enough liquid in the bottom of the column to permit a sump for suction through line 16 to pump 17. Any continuous gaseous phase absorption chamber such as the preferred packed column 11 or an unpacked open spray chamber could be used. Liquid flooding of the packing or the inefficient bubbling of gas through a liquid pool or continuous liquid phase should be avoided. However, any vessel with a continuous vapor phase could be used, even if the vessel also has a continuous liquid phase such as a liquid film on the inner perimeter or falling film in a thin-film contactor type of operation. Continuous gas phase with discontinuous liquid phases as on a bubble cap tray could also be used for absorption in this invention. The gaseous stream passes upwardly through absorption chamber 11 in countercurrent contact with an aqueous solution containing a basically reacting ammonium compound, e.g., a mixture of ammonium carbonate and ammonium bicarbonate. The aqueous solution is introduced to the upper portion of chamber 11 via line 15 and flows downwardly over the packing 12, 13, and 14. A portion of the aqueous solution, enriched in ammonium nitrite, is withdrawn as recycle stream from chamber 11 via line 16 and is passed by pump 17 through cooling apparatus 18 wherein the recycle stream is cooled to the desired temperature, e.g., 5° C. to 25° C. The recycle stream passing from cooling apparatus 18 is recycled via line 19 and line 15 to chamber 11. A minor portion of the gaseous stream in line 10 is passed via line 20 to nitric oxide oxidizer 21 which is sized to give an average reacton time of from 0.1 to 5 minutes. Optionally, oxygen or an oxygen-containing gas may be added to the gaseous stream fed to oxidizer 21 via line 20. The gaseous stream from line 20 passes upwardly through oxidizer 21 at the desired reaction temperature, e.g., 45° C. to 75° C., whereby a substantial portion, e.g., 80 to 90 percent, of the nitric oxide is oxidized to nitrogen dioxide. Nitric oxide oxidizer 21 preferably contains baffles 28 to prevent end to end mixing of the gas in the oxidizer. The oxidized gas exits nitric oxide oxidizer 21 via line 23 and passes to absorption chamber 11 where the gas is fed below packed section 13. Waste gas from chamber 11 is discharged via line 26. A product stream comprising aqueous solution enriched in ammonium nitrite and containing residual basically reacting ammonium compounds is withdrawn from the process via line 27.

The present invention may be further illustrated by reference to the following examples. All parts and percentages are by weight unless otherwise indicated.

EXAMPLE 1 (COMPARATIVE)

Part 1 (Conventional Process)

An absorption tower having three packed sections, packed with 1 and 2-inch porcelain saddles, as shown in the accompanying drawing, is continuously fed at about 11° C. and at atmospheric pressure with an aqueous solution containing 5.5 percent ammonium bicarbonate and 16.4 percent ammonium carbonate at a flow rate of 516 parts per hour. The solution in the tower is continuously and countercurrently contacted with 518 parts per hour of a gaseous stream having a temperature of 35° C. and the following volume percent composition: 5.6 percent water vapor; 79.2 percent nitrogen; 8.25 percent nitric oxide; 0.92 percent nitrogen dioxide, and 5.96 percent oxygen. A portion of the aqueous solution enriched in ammonium nitrite is cooled and continuously recycled to the aqueous solution feed. A product stream is continuously withdrawn from the recycle stream at a flow rate of 598 parts per hour, said stream containing 13.4 percent ammonium nitrite. Exit gas from the absorption tower contains 1.2 volume percent nitrogen oxides.

Part 2 (Process of Present Invention)

In a second run, the above absorption tower is maintained at a pressure of 10 psig. at the top of the absorption tower at the opening for the gas exit line. All pressures specified in this application are pressures at that same gas exit point. The absorption tower is continuously fed with an aqueous solution of the above composition at a flow rate of 516 parts per hour. The solution in the tower is continuously and countercurrently contacted with 466 parts per hour of a gaseous stream of the above composition. As shown in the drawing, about 52 parts per hour of a gaseous stream of the above composition are continuously fed to the nitric oxide oxidizer. The gas temperature in the nitric oxide oxidizer is maintained at 55° C., and about 90 percent of the nitric oxide is converted to nitrogen dioxide. The gaseous stream from the nitric oxide oxidizer at about 55° C. is continuously fed to the absorption tower immediately below the middle packed section, at which point in the tower the absorption of nitrogen oxide is about 95 percent complete, based on the nitrogen oxides being fed to the base of the tower. By said addition of nitrogen dioxide to the absorption tower, the nitrogen dioxide:nitric oxide mol ratio of the gas mixture is increased to between 2 and 3. A portion of the aqueous solution from the bottom of the tower enriched in ammonium nitrite is cooled to 11° C. and continuously recycled to the aqueous solution feed. A product stream is continuously withdrawn from the recycle stream at a flow rate of about 600 parts per hour, containing about 15 percent ammonium nitrite. Exit gas from the absorption tower contains about 0.06 volume percent nitrogen oxides. This represents a surprising reduction in pollution of the atmosphere over the conventional process. Yields of ammonium nitrite up to 91 percent of theory are obtained, and there is little ammonium nitrate-ammonium nitrite containing mist in the vent gas.

In additional similar tests, it is demonstrated that it is preferred to operate the absorption system at 5 to 20 psig., desirably at 10 to 20 psig. Surprisingly, the amount of ammonium nitrate-ammonium nitrite mist in the vent gas decreases with increased pressure and none is noted at 20 psig.

Desirably, the exit gas from the tower is passed through a conventional venturi scrubber before the gas is vented to the atmosphere. When this is done, the vent gas exit the scrubber contains about 100 to 170 ppm nitrogen oxides. The water (or aqueous solution containing a basically reacting ammonium compound) used in the venturi scrubber may be recycled to recover a mixture of ammonium nitrite and ammonium nitrate having a nitrite to nitrate mol ratio of about 0.6.

EXAMPLE 2

The procedure of Example 1, Part 1, is followed except that the absorption tower is maintained at a pressure of 10 psig instead of at atmospheric pressure. Surprisingly, with use of this 10 psig pressure, exit gas from the absorption tower is reduced to 0.38 volume percent nitrogen oxides. Little ammonium nitrate-ammonium nitrite mist was noted in the vent gas.

EXAMPLE 3

The procedure of Example 1, Part 2, is followed except that the absorption tower is maintained at atmospheric pressure instead of at 10 psig. The exit gas from the absorption tower contains about 0.87 volume percent nitrogen oxides plus a significant amount of ammonium nitrate-ammonium nitrite mist. Please note that this example substantially follows the specific example furnished in U.S. Pat. 4,045,540 to Hertzog referred to hereinabove.

EXAMPLE 4

With respect to pollution of the environment with nitrogen oxides in the vent gas, this example shows by tabulating the data from Examples 1 to 3 that a synergistic improvement results from combination of slight pressure in the absorption system with late addition of supplemental quantities of nitrogen dioxide to the absorption system in accordance with the present invention.

TABLE 1

| Absorption System | | Nitrogen Oxides |
|---|---|---|
| Pressure, psig | Late NO$_2$ Addition | in Vent Gas, ppm |
| 0 | No | 12,000 (a) |
| 0 | Yes | 8,700 (b) |
| 10 | No | 3,800 (c) |
| 10 | Yes | 600 (d) |

(a) See Example 1, Part 1
(b) See Example 3
(c) See Example 2
(d) See Example 1, Part 2, which demonstrates the preferred process of the present invention. Also note in Example 1, Part 2, that nitrogen oxides in the vent gas can be further reduced by scrubbing the vent gas with water using a venturi scrubber.

EXAMPLE 5 (Comparative)

Example 4 shows the synergistic improvement in the amount of atmospheric pollution which results from combination of slight pressure in the absorption system with late addition of nitrogen dioxide to the absorption system. The present example is provided to show the surprisingly high yields of ammonium nitrite obtained when said pressure in the absorption system is maintained within the preferred range of 5 to 20 psig. However, it is important that the yield of by-product ammonium nitrate increases rapidly as the pressure is increased from 5 to 20 psig. or more. Optimum yields of ammonium nitrite (with relatively low yields of ammonium nitrate) are obtained at a pressure of about 10 to 15 psig. Accordingly, the process of the present invention is preferably operated within the range 5 to 20 psig., most preferably at about 10 to 15 psig. The data are tabulated below in Table 2. Section A of Table 2 shows the effect of pressure variation on a process otherwise carried out in accordance with the conventional procedure of Example 1, Part 1. Section B shows the effect of pressure variation on the preferred process of the present invention as described in Example 1, Part 2.

TABLE 2

| Absorption System | | Nitrogen Oxides | NH$_4$NO$_2$ | NH$_4$NO$_3$ |
|---|---|---|---|---|
| Pressure, psig | Late NO$_2$ Addition | in Vent Gas, ppm | Yield, % | Yield, % |
| Section A | | | | |
| 0 | No | 12,000 | 79.3 | 2.5 |
| 5 | No | 4,500 | 85.3 | 3.4 |
| 10 | No | 3,800 | 90.5 | 4.4 |
| 15 | No | 1,350 | 90.8 | 6.9 |
| 20 | No | 820 | 85.4 | 12.7 |
| Section B | | | | |
| 0 | Yes | 8,700 | 82.8 | 6.8 |
| 5 | Yes | 1,200 | 83.7 | 7.0 |
| 10 | Yes | 600 | 88.0 | 7.3 |
| 15 | Yes | 90 | 88.9 | 9.5 |
| 20 | Yes | 75 | 85.6 | 13.4 |

We claim:

1. In a process for producing ammonium nitrite by the absorption in a continuous gaseous phase absorption chamber of a gas containing nitric oxide, nitrogen dioxide, oxygen and at least 65 percent by volume of inert gas in an absorption system with an aqueous absorbing solution containing a basically reacting ammonium compound selected from the group consisting of ammonium carbonate, ammonium bicarbonate, ammonium hydroxide and mixtures thereof, employing entering gas with at least 2.0 mol ratio of nitric oxide:nitrogen dioxide and employing absorbing solution having normality of at least 0.1 with respect to the basically reacting ammonium compound, the improvement which comprises:
   (a) maintaining the absorption system at a pressure of 5 to 25 psig;
   (b) adding supplemental nitrogen dioxide to said gas being absorbed in the absorption system, said supplemental nitrogen dioxide being added to said gas when the absorption of nitrogen oxides is 50 to 99 percent complete based on the nitrogen oxides in the entering gas, said supplemental nitrogen dioxide being added to said gas in amount sufficient to provide a nitrogen dioxide:nitric oxide mol ratio between 1 and 4 in the resulting mixture, whereby nitrogen oxide emission as vent gas from the absorption system is significantly reduced.

2. The process of claim 1 wherein said basically reacting ammonium compound is ammonium bicarbonate.

3. The process of claim 1 wherein said basically reacting ammonium compound is ammonium carbonate.

4. The process of claim 1 wherein said basically reacting ammonium compound is ammonium hydroxide.

5. The process of claim 1 wherein said basically reacting ammonium compound is a mixture of ammonium bicarbonate and ammonium carbonate.

6. The process of claim 1 further characterized in that vent gas from the absorption system is contacted with water in a venturi scrubber.

7. The process of claim 1 wherein the absorption system is maintained at a pressure of 5 to 20 psig.

* * * * *